July 15, 1958 G. F. ABBOTT, JR 2,843,838

FERROMAGNETIC TRANSLATING APPARATUS

Filed Aug. 23, 1955

INVENTOR
G. F. ABBOTT, JR.
BY
ATTORNEY

United States Patent Office 2,843,838

Patented July 15, 1958

2,843,838

FERROMAGNETIC TRANSLATING APPARATUS

George F. Abbott, Jr., New York, N. Y., assignor to Bell Telephone Laboratories, Incorporated, New York, N. Y., a corporation of New York Application August 23, 1955, Serial No. 530,181

7 Claims. (Cl. 340—166)

This invention relates to ferromagnetic translating apparatus, and more particularly to a ferromagnetic translator circuit using square hysteresis loop cores as switching elements.

In large switching systems, such as telephone switching systems, the data introduced into the system by means of electrical signals, for example, are ordinarily not intended for remote control purposes but, instead, are used as information or order-delivering means. This information is generally recorded in the system in storage units, and is transferred from point to point within the system by means of combinations of signals on groups of interconnecting leads in which each combination represents an item of information or a code designation. In accordance with individual and varying circuit requirements, one group of combinations or one code may be more economical, or desirable, from the standpoint of simplicity or for other reasons, than another code. As a result, several combinations or codes representing equivalent information may exist. To translate rapidly from one code to another, translating devices are utilized. In the past, certain translating devices, although completely operative, have necessitated for their proper functioning considerable additional circuit complexity.

It is, therefore, an object of this invention to provide accurate translation from one code to another with a minimum of additional circuit complexity.

A further object of this invention is to provide for the translation from a three-digit input to one code point in a thousand.

A feature of this invention resides in a translating device, the storage components of which are made of materials that lend themselves to economical manufacture in large quantities.

Another feature of this invention pertains to a device which will achieve accurate and rapid translation between codes with few mechanical operating components, thereby minimizing maintenance requirements.

These and other objects and features of the invention are realized in an embodiment incorporating a ferromagnetic translator circuit using square hysteresis loop cores as switching elements. ("Square hysteresis loop cores" in this description and in the appended claims connotes magnetic cores, the "B–H" curve of which has adjacent sides that approach each other at substantially right angles. It is understood that the ratio of the "B" and "H" dimensions will vary with the type of application and other factors.) Means are provided for translating from a three-digit input to a one-in-a-thousand output. The magnetic cores are arranged in groups of ten, one group for each of the input digits. A total of 1,000 "read-out" wires are threaded through the magnetic cores in such manner as to correspond with the code which each wire represents. Each of these wires is threaded according to a predetermined pattern through a unique group of cores, the numbers of the cores in each group corresponding to the code designation of the individual conductor.

In operation, one core in each group is set by driving it to saturation in a given magnetic direction, for example, the positive direction. As a consequence of the characteristic hysteresis loop for the type of core employed, the core remains in the particular state to which it has been driven. Subsequently, all of the cores in each group are driven to the opposite magnetic saturation region by an impulse applied to an individual wire threaded through each core for that purpose. Only those cores that were initially "set" by being driven to positive magnetic saturation will induce a pulse in the conductors threaded therethrough. Those magnetic cores which were not set by being first driven to positive magnetic saturation do not induce pulses in their associated conductors. The configuration of the circuit is such that only one conductor will receive the cumulative pulsing effect of three cores while a greater number of conductors will be pulsed by less than three cores.

Inasmuch as the wires are all pulsed in the same direction, the amplitude of the pulse in that conductor which has been threaded through the three selected cores will be at least one and a half times greater than the amplitude of the pulse induced in any other conductor. Amplitude sensitive means are connected to each of the output conductors to indicate which of said conductors is the selected one.

The foregoing and other objects and features will be more readily understood from the following description and attached drawing in which.

Figure 1:
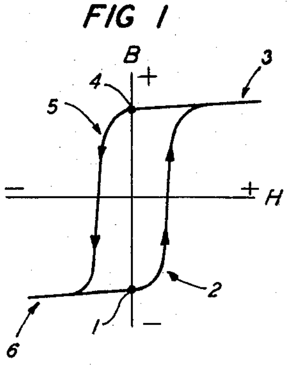
Fig. 1 represents the hysteresis characteristic of a magnetic core as exemplary of that which may be used in conjunction with the present invention.

Referring now to Fig. 1, a hysteresis loop illustrating a basic storage principle used in ferromagnetic memory devices is shown. Points 4 and 1 in the figure are, respectively, the positive and negative "remanent" points illustrating the magnetic state at which the material remains when no magnetomotive force is applied. Regions 3 and 6 are those to which the core must be driven by the application of magnetomotive force to drive the core from a given remanent point to the point of the opposite polarity. Regions 2 and 5 represent graphically the state which the core will attain if a magnetomotive force is applied which is of insufficient intensity to drive the core from one polarity to the opposite.

In the following description of the operation of the invention, it will be assumed that all the cores are initially in the negative remanent state, that is, point 1, or else are driven thereto prior to use.

In the process of "setting" a core, a pulse of current is sent through a conductor threaded through the core, said pulse being in the direction that will drive the core from point 1 in Fig. 1, along the hysteresis curve in the direction of the arrowheads through region 2, to region 3. After the termination of the pulse, the core assumes a magnetic state represented by point 4, that is, by the number of gausses remaining within the core which is represented graphically by the level of point 4 at a time when the applied magnetic force is zero. After the selected core has been energized, all of the cores (including the selected core) are driven toward negative saturation, the selected core passing from the positive remanent state point 4 in the direction of the arrowheads through region 5, to negative saturation zone 6. In the following description, the pulse by which all the cores are driven to negative saturation is referred to as a reset pulse. Upon the termination of the reset pulse, the magnetic condition of the core reverts to point 1, at which time the core is available for repetition of the foregoing cycle.

Figure 2:
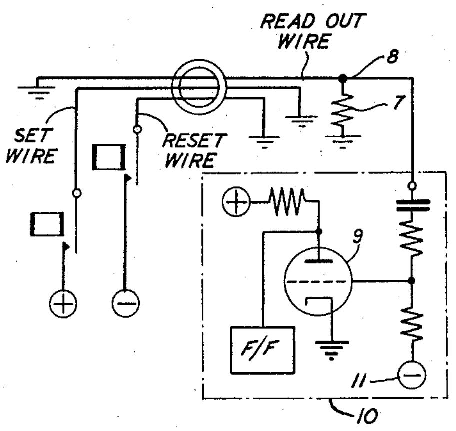
Fig. 2 represents the overall circuit and electrical connections to a single magnetic core.
Figure 3:
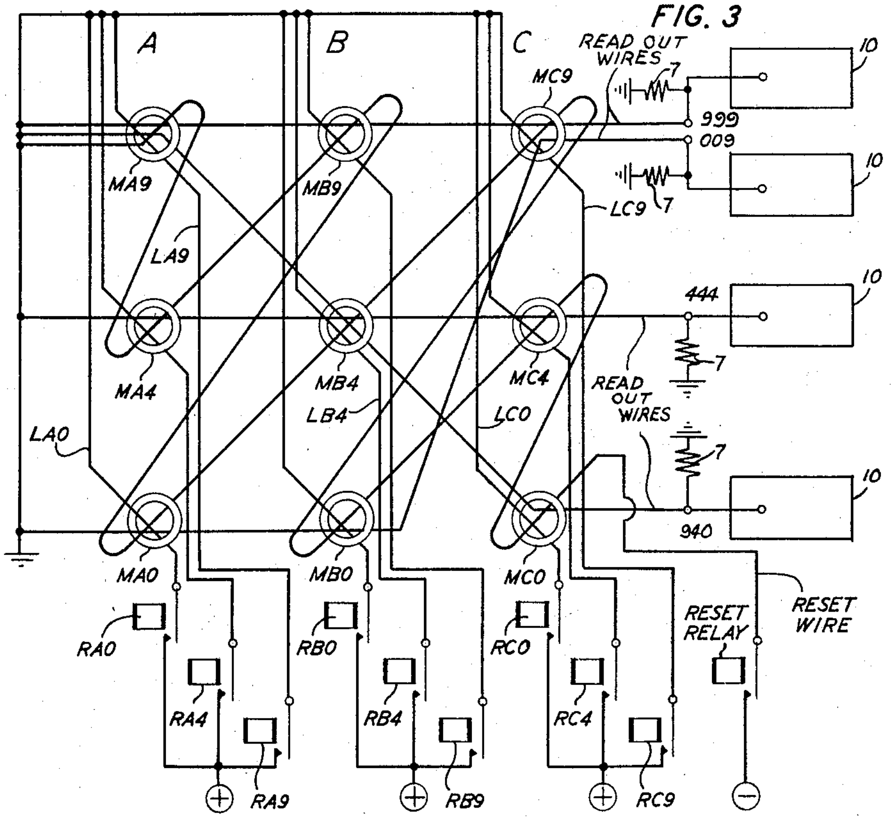
Fig. 3 is a partial representation of a matrix capable of translating from a three-digital input to a one-in-a-thousand output, using magnetic cores as switching elements.

Fig. 2 illustrates, for purposes of clarity of description, the electrical circuits associated with a particular core, typical of the cores utilized in Fig. 3. It is seen that in each instance a "set" wire, a "reset" wire, and a "read-out" wire are threaded through each core. The selected set wire is employed to deliver an impulse which will drive the cores through which the wire is threaded from their original negative saturation state, represented at point 1 in Fig. 1, to the positive state represented at point 4 in Fig. 1. The reset wire is utilized for resetting the core from the positive remanent state to the negative remanent state, thereby reestablishing the original condition therein. The read-out wire, unlike the set wire and reset wire, does not carry current therethrough to influence the core, but has, instead, current induced in it by the flux changes in the core. The read-out wire, therefore, is available for detecting a change in flux, or potential, when the core is driven from one magnetic state to the opposite. This potential change is detected across resistor 7 by amplitude sensitive detection apparatus 10 connected to terminal 8.

The apparatus 10 includes a triode gate circuit 9, the output of which is connected to a flip-flop circuit F/F shown symbolically. The flip-flop may, for example, be an Eccles-Jordan circuit of the type illustrated in "The Design of Switching Circuits" by Keister et al., 1951, at Fig. 11–7.

Bias source 11 is arranged to be less than the voltage induced by the cumulative pulsing effect of three cores but greater than that induced by one or two cores.

Fig. 3 represents an abbreviated configuration of a matrix of square hysteresis loop magnetic cores that may be employed in conjunction with the present invention. Thirty cores are arranged in three groups of ten, one group of cores for the "A" digit (cores MA0 . . . MA9), another for the "B" digit (cores MB0 . . . MB9), and a third for the "C" digit (cores MC0 . . . MC9). In Fig. 3, for purposes of simplicity, only three out of the ten cores in each group are shown, namely, cores No. 0, No. 4 and No. 9. As expected from the previous description with regard to Fig. 2, only one reset wire is threaded through each of the cores, in the same direction, as shown in the diagram. Individual set wires are threaded through the corresponding cores in accordance with the digital code to be employed. Thus, lead LA0 is threaded only through core MA0, conductor LB4 is threaded only through core MB4, and conductor LC9 is threaded only through core MC9, etc. Individual relays are shown for energizing particular set wires in accordance with the code to be translated, but it is understood that any other switching device may be utilized, if desired, for energizing said wires, thereby driving the selected cores from the negative remanent state to the positive remanent state, all other cores remaining unaffected.

The read-out wires are threaded through the cores in the matrix in accordance with the particular code which the read-out wire represents. Each of the read-out wires is terminated individually in accordance with its code designation. The terminal of the read-out wire is further connected to resistance 7 and to an amplitude sensitive device 10 (shown in detail in Fig. 2). It is understood that the amplitude sensitive device 10 is merely exemplary and that other devices including ballistic galvanometers, marginal relays, gas tubes or any other device capable of distinguishing between differences of potential may be employed.

Read-out wire 940, representing A digit 9, B digit 4 and C digit 0, may be traced from ground through core MA9, core MB4, and core MC0, to terminal 940. Likewise, the other conductors may be traced through corresponding cores to their respective terminations.

It is to be understood that although only four read-out wires are shown, they are intended to exemplify the 1,000 read-out wires 000 . . . 999 that are threaded through the thirty cores of which only nine are shown in the embodiment of Fig. 3. It is seen from the configuration of the core matrix that each core in the "A," "B" and "C" groups will have 100 read-out conductors threaded therethrough.

To illustrate the operation of the device, a hypothetical code translation will be assumed, i. e., a translation from three-digit input code A9, B4 and C0 to the one-in-a-thousand output code 940. Here again, it is assumed that all the cores are initially in the negative remanent state or are driven thereto by energization of the reset relay, for example. The operation begins with the energization of relays RA9, RB4 and RC0 in any suitable manner. This completes three separate circuits as follows: positive battery, the contacts of relay RA9, conductor LA9 threaded through core MA9, to ground; positive battery, contacts of relay RB4, conductor LB4 threaded through core MB4, to ground; and positive battery, contacts of relay RC0, conductor LC0 threaded through core MC0, to ground. Relays RA9, RB4 and RC0 are subsequently released, leaving the affected cores MA9, MB4 and MC0 in the positive remanent condition illustrated at point 4, Fig. 1. All other cores, however, are unaffected and remain in the negative remanent region indicated at point 1 in Fig. 1. To translate, a negative pulse is then delivered through the reset wire which is serially threaded in the same direction through all of the cores, by energizing the reset relay associated therewith for a brief period of time. As has been pointed out in prior discussion, a negative impulse will be applied to each core and a negative magnetomotive force will be generated thereby in each core, but only those cores which are in the positive remanent condition will undergo internal changes in flux density which, in turn, will occasion significant pulses of current in the conductors connected therethrough.

Examining Fig. 3, it may be seen that core MA9 will pulse read-out lead 940 which is threaded therethrough, but said core will also induce a pulse in the 99 other read-out conductors associated therewith. Likewise, cores MB4 and MC0 will each induce pulses of a like magnitude in the 100 read-out wires located therein. It may be seen, however, that only conductor 940 is pulsed by all three cores. Since the amplitude sensitive device 10 has a threshold response which is designed to reject pulses induced by less than three cores, as explained supra, only that device 10 connected to conductor 940 will repond by activating its triode gate 9 and flip-flop F/F. The operation of the flip-flop indicates that conductor 940 is the selected conductor, thereby completing the translation.

While I have illustrated my invention by particular embodiments thereof, said invention is not limited in its application to the specific apparatus and particular arrangements herein disclosed. Various applications and modifications of the invention will readily occur to those skilled in the art without departing from the scope of the invention.

What is claimed is:

1. A translating device comprising a plurality of magnetic cores, a plurality of set wires threaded through said cores and adapted when selectively energized to drive certain of said cores to a first magnetic state, a plurality of read-out wires each representative of a digit or character and each threaded through said cores in a combination individual to said digit or character, and a reset wire threaded through all of said cores and adapted when energized to drive all of said cores to a second magnetic state, thereby to energize a selected read-out wire threaded through all the cores initially driven to said first magnetic state to a higher electrical level than the other read-out wires.

2. A code translating device comprising a plurality of magnetic cores arranged in three groups, each group representing a particular digit of a multidigit number, a plurality of set wires threaded through said cores and adapted when selectively energized to drive certain of said cores to a first magnetic state, a plurality of read-out wires each representative of a particular number and threaded through said cores in a combination individual to said number, a reset wire threaded through all of said cores in the same direction, means for applying a current pulse through said reset wire to drive all of said cores to a second magnetic state and to energize a read-out wire threaded through the cores initially driven to said first magnetic state, and amplitude sensitive apparatus connected to said read-out wires and adapted to identify the read-out wire in which is induced the highest cumulative pulse upon the application of said current pulse to said reset wire.

3. A ferromagnetic code translation device comprising in combination a plurality of groups of square hysteresis loop cores, each of said groups representing a particular digit in a multidigit code, a plurality of set wires individually threaded through said cores, means for applying a pulse of current through particular ones of said set wires for driving the associated cores to a first magnetic state, a plurality of read-out wires each indicative of a particular code and threaded through said cores in a combination individual to said code, a reset wire threaded through all of said cores in the same direction, and means for applying a pulse of current to said reset wire to drive all of said cores to a second magnetic state, thereby to energize a selected read-out wire threaded through all the cores initially driven to said first magnetic state to a higher current level than the other read-out wires.

4. A magnetic translation device comprising a plurality of square hysteresis loop cores, a plurality of set wires each threaded through one of said cores, a plurality of set relays connected to said set wires, a positive current source connected to said set relays, means for selectively operating said set relays thereby to deliver a pulse of current from said positive source through certain of said set wires, thereby to drive the cores through which the energized set wires are threaded to a positive magnetic state, a plurality of read-out wires each indicative of a different code designation and each threaded through said cores in a combination individual to one of said code designations, a reset wire threaded through all of said cores in the same direction, a reset relay connected to said reset wire, a negative current source connected to said reset relay, means for operating said reset relay to deliver a pulse of current from said negative current source through said reset wire, thereby to drive all of said cores to a negative magnetic state and energize a read-out wire threaded through all the cores initially driven to said positive magnetic state, and amplitude sensitive means connected to said read-out wires and adapted to identify said read-out wire threaded through all the cores initially driven to said positive magnetic state.

5. A ferromagnetic translation device comprising a plurality of square hysteresis loop cores, a plurality of set wires individually threaded through each of said cores, a positive current source, set relays adapted when operated to connect said positive current source to said set wires thereby to drive said cores to a positive magnetic state, a reset wire threaded through each of said cores in the same direction, a negative current source, a reset relay adapted when operated to connect said negative current source to said reset wire thereby to drive all of said cores to a negative magnetic state, a plurality of read-out wires not exceeding in number the maximum number of combinations of three digits, said plurality of read-out wires being selectively threaded through said cores in a combination each defining a three-digit number, and amplitude sensitive means connected to said read-out wires and adapted to identify the particular wire in which is induced the maximum current pulse upon operation of the reset relay.

6. A ferromagnetic translation device comprising three groups of square hysteresis loop cores, each group representing a digit in a multidigit code, a plurality of set wires individually threaded through said cores, a positive current source, a plurality of set relays adapted when selectively operated to connect said positive current source to certain of said set wires in accordance with the digits to be translated, thereby to drive the cores through which are threaded the energized set wires to a positive magnetic state, a single reset wire threaded through all of said cores in a given direction, a negative current source, a reset relay adapted when operated to connect said negative current source to said reset wire, thereby to drive all of said cores to a negative magnetic state, a plurality of read-out wires individually threaded through said cores each in accordance with a code defining a multidigit number, and amplitude sensitive means connected to said read-out wires and adapted to identify the read-out wire in which is induced the highest cumulative current pulse on the operation of the reset relay.

7. A ferromagnetic translation device comprising thirty square hysteresis loop cores arranged in three groups of ten cores each, each group representing a single digit in a three-digit code, thirty set wires individually threaded through said cores, a positive current source, thirty set relays adapted when selectively operated to connect said positive current source to a selected three of said set wires, thereby to drive the three cores through which said three wires are threaded to a positive magnetic state, a single reset wire threaded through all of said cores in the same direction, a negative current source, a reset relay adapted when operated to connect said negative current source to said reset wire, thereby to drive all of said cores to the negative magnetic state, one thousand read-out wires threaded through said cores in unique combinations each according to a specific grouping of said three-digit code, and amplitude sensitive means connected to said read-out wires for identifying the single wire pulsed by said three cores upon the operation of the reset relay.

References Cited in the file of this patent

UNITED STATES PATENTS 2,734,182 Rajchman ______________ Feb. 7, 1956